US011752997B2

(12) United States Patent
Nakashima et al.

(10) Patent No.: US 11,752,997 B2
(45) Date of Patent: Sep. 12, 2023

(54) CONTROL DEVICE AND COMPUTER READABLE STORAGE MEDIUM

(71) Applicant: HONDA MOTOR CO., LTD., Tokyo (JP)

(72) Inventors: Takanori Nakashima, Saitama (JP); Takeshi Saito, Saitama (JP); Tomohiro Shibata, Saitama (JP); Masashi Eto, Saitama (JP); Shinya Miwa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 158 days.

(21) Appl. No.: 17/165,950

(22) Filed: Feb. 3, 2021

(65) Prior Publication Data

US 2021/0253080 A1 Aug. 19, 2021

(30) Foreign Application Priority Data

Feb. 18, 2020 (JP) ................................ 2020-025637

(51) Int. Cl.
*B60W 20/12* (2016.01)
*B60W 50/02* (2012.01)
(Continued)

(52) U.S. Cl.
CPC ............ *B60W 20/12* (2016.01); *B60W 10/06* (2013.01); *B60W 20/40* (2013.01); *B60W 50/0205* (2013.01); *B60W 2556/45* (2020.02)

(58) Field of Classification Search
CPC ...... B60W 20/12; B60W 10/06; B60W 20/40; B60W 50/0205; B60W 2556/45;
(Continued)

(56) References Cited

U.S. PATENT DOCUMENTS 9,050,975 B2 * 6/2015 Fushiki ................. B60W 10/06
10,864,794 B2 * 12/2020 Lee ......................... B60H 1/004
(Continued)

FOREIGN PATENT DOCUMENTS

CN 103328243 A 9/2013
EP 2055935 A1 5/2009
(Continued)

OTHER PUBLICATIONS

Office Action issued for counterpart Chinese Application 202110135250.6, issued by The State Intellectual Property Office of People's Republic of China dated Jul. 6, 2023.
(Continued)

*Primary Examiner* — Rachid Bendidi
*Assistant Examiner* — Dana F Artimez (57) ABSTRACT

A control device is provided, which includes: a route determining unit configured to determine a travelling route of a hybrid vehicle; a travelling time estimating unit configured to, in a case where the travelling route includes an engine travelling restricted section and an engine requiring section, in which engine travelling is required, exists before the engine travelling restricted section in the travelling route, estimate a travelling time during which the hybrid vehicle travels from the beginning of the engine requiring section to the engine travelling restricted section; and a vehicle control unit configured to cause the hybrid vehicle to start the engine before the engine requiring section when the travelling time is shorter than a predetermined time.

15 Claims, 9 Drawing Sheets

(51) Int. Cl.
*B60W 10/06* (2006.01)
*B60W 20/40* (2016.01)

(58) Field of Classification Search
CPC .. B60W 2556/50; B60W 10/08; B60W 20/50;
B60W 50/009; B60W 50/0097; Y02T
10/62
See application file for complete search history.

(56) References Cited

U.S. PATENT DOCUMENTS

| | | | |
|---|---|---|---|
| 2011/0022259 A1 | 1/2011 | Niwa | |
| 2014/0067179 A1 | 3/2014 | Amano | |
| 2016/0186674 A1* | 6/2016 | Umesaka | F02D 29/02 |
| | | | 701/22 |
| 2019/0390970 A1* | 12/2019 | Cha | B60W 20/13 |
| 2021/0129828 A1* | 5/2021 | Bruhn | F01N 3/023 |

FOREIGN PATENT DOCUMENTS

| | | | | |
|---|---|---|---|---|
| EP | 3032062 A1 | 6/2016 | | |
| JP | 2007099030 A | * | 4/2007 | ......... F02N 11/0818 |
| JP | 2009244142 A | 10/2009 | | |
| JP | 2013177089 A | 9/2013 | | |
| JP | 2016107736 A | 6/2016 | | |
| JP | 2019085094 A | 6/2019 | | |

OTHER PUBLICATIONS

Office Action issued for counterpart Japanese Application No. 2020-025637, dated Jul. 18, 2023 (dated Jul. 11, 2023).

* cited by examiner

CONTROL DEVICE AND COMPUTER READABLE STORAGE MEDIUM

The contents of the following Japanese application are incorporated herein by reference:

NO. 2020-025637 filed in JP on Feb. 18, 2020.

BACKGROUND

1. Technical Field

The present invention relates to a control device and a computer readable storage medium.

2. Related Art

Patent document 1 describes a technique for selecting an OBD (On-Board Diagnostics) executing section based on a travelling route. Patent document 2 describes a technique for performing route navigation by detecting an engine travelling restricted section on a travelling route. Patent document 3 describes a technique for performing engine control by detecting an engine travelling restricted section on a travelling route.

PRIOR ART DOCUMENTS

Patent Documents

[Patent document 1] Japanese Patent Application Publication No. 2016-107736
[Patent document 2] Japanese Patent Application Publication No. 2009-244142
[Patent document 3] Japanese Patent Application Publication No. 2019-085094

DESCRIPTION OF EXEMPLARY EMBODIMENTS

Hereinafter, the present invention will be described through the embodiments of the invention. However, the embodiments described below do not limit the invention according to the claims. In addition, not all combinations of features described in the embodiments are necessarily required for solutions of the invention.

Figure 1:
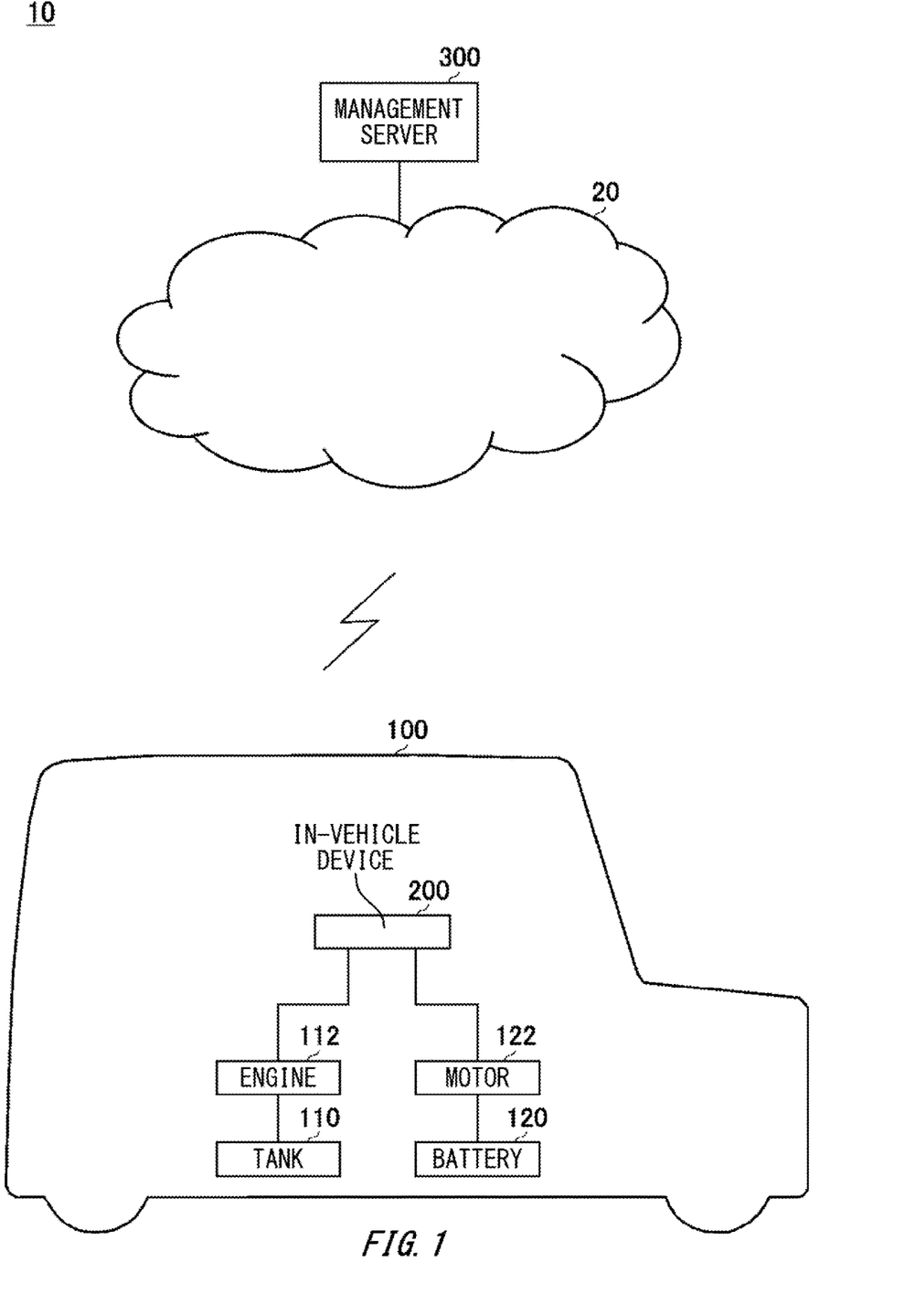
FIG. 1 schematically shows one example of a system 10.

FIG. 1 schematically shows one example of a system 10. The system 10 includes an in-vehicle device 200 and a management server 300. The system 10 may include a hybrid vehicle 100.

The in-vehicle device 200 is mounted in the hybrid vehicle 100. The hybrid vehicle 100 includes a tank 110, an engine 112, a battery 120, and a motor 122. The hybrid vehicle 100 can perform engine travelling in which the hybrid vehicle 100 uses the engine 112 and non-engine travelling in which the hybrid vehicle 100 does not use the engine 112.

In a case where the hybrid vehicle 100 is a parallel hybrid vehicle, the engine travelling may be a travelling method in which the hybrid vehicle 100 travels by operating the engine 112 and driving the motor 122 with electrical power generated by driving a generator with the engine 112. The engine travelling may be a travelling method in which a drive shaft is rotated by power of the engine 112. The engine travelling may be a travelling method in which the hybrid vehicle 100 travels by a combination of the power of the engine 112 and the power of the motor 122. The non-engine travelling may be a travelling method in which the hybrid vehicle 100 travels by driving the motor 122 with the electrical power of the battery 120 without operating the engine 112.

In a case where the hybrid vehicle 100 is a series hybrid vehicle, the engine travelling may be a travelling method in which the hybrid vehicle 100 travels by operating the engine 112 and driving the motor 122 with the electrical power generated by driving a generator with the engine 112. The non-engine travelling may be a travelling method in which the hybrid vehicle 100 travels by driving the motor 122 with the electrical power of the battery 120 without operating the engine 112.

In a case where the hybrid vehicle 100 is a series-parallel hybrid vehicle, the engine travelling may be a travelling method in which the hybrid vehicle 100 travels by operating the engine 112 and driving the motor 122 with the electrical power generated by driving a generator with the engine 112, a travelling method in which a drive shaft is rotated by power of the engine 112, or a travelling method in which the hybrid vehicle 100 travels by a combination of the power of the engine 112 and the power of the motor 122. The non-engine travelling may be a travelling method in which the hybrid vehicle 100 travels by driving the motor 122 with the electrical power of the battery 120 without operating the engine 112.

The in-vehicle device 200 is configured to control the hybrid vehicle 100. The in-vehicle device 200 may receive various types of information from the management server 300 via a network 20. For example, the in-vehicle device 200 is configured to receive map data from the management server 300. The in-vehicle device 200 may receive road information from the management server 300. The in-vehicle device 200 may receive weather information from the management server 300.

The road information may include a type of a road. The road information may include a shape of the road. The shape of the road may include a grade of the road. The road information may include a speed limit of the road. The road information may include a congestion degree of the road. The road information may include a statistical vehicle velocity of the road. The map data may include area information indicating a residential area, an educational facility, a commercial area, or the like. The map data may include building information indicating a type of a building.

The map data may be associated with information indicating an engine travelling restricted section, which is a section where the engine travelling is restricted. For example, the engine travelling restricted section is an area where noise should be suppressed such as a residential area and an educational facility. The engine travelling restricted section may be an area that is designated for improving air pollution.

The map data may be associated with information indicating an engine requiring section in which an engine output is required. For example, the engine requiring section may be an upward slope, a junction area to a highway, or the like.

The network 20 may be any network. For example, the network 20 includes a mobile communication network such as the so-called 3G (3rd Generation), LTE (Long Term Evolution), 4G (4th Generation), and 5G (5th Generation). The network 20 may include the so-called WiFi (Wireless Fidelity) network. The network 20 may include the Internet.

The in-vehicle device 200 according to the present embodiment is configured to determine a travelling route of the hybrid vehicle 100 (which may be described as the own vehicle) in which the in-vehicle device 200 is mounted, and, in a case where the travelling route includes an engine travelling restricted section and an engine requiring section, in which the engine travelling is required, exists before the engine travelling restricted section in the travelling route, estimate a travelling time during which the own vehicle travels from the beginning of the engine requiring section to the engine travelling restricted section.

The in-vehicle device 200 is configured to cause the own vehicle to start the engine 112 before the engine requiring section when the estimated travelling time is shorter than a predetermined time. The predetermined time may be a time that is set as the time required for self-diagnostics to be executed during an engine 112 operation of the hybrid vehicle 100. The self-diagnostics may be OBD failure detection. The in-vehicle device 200 may be one example of the control device.

Figure 2:
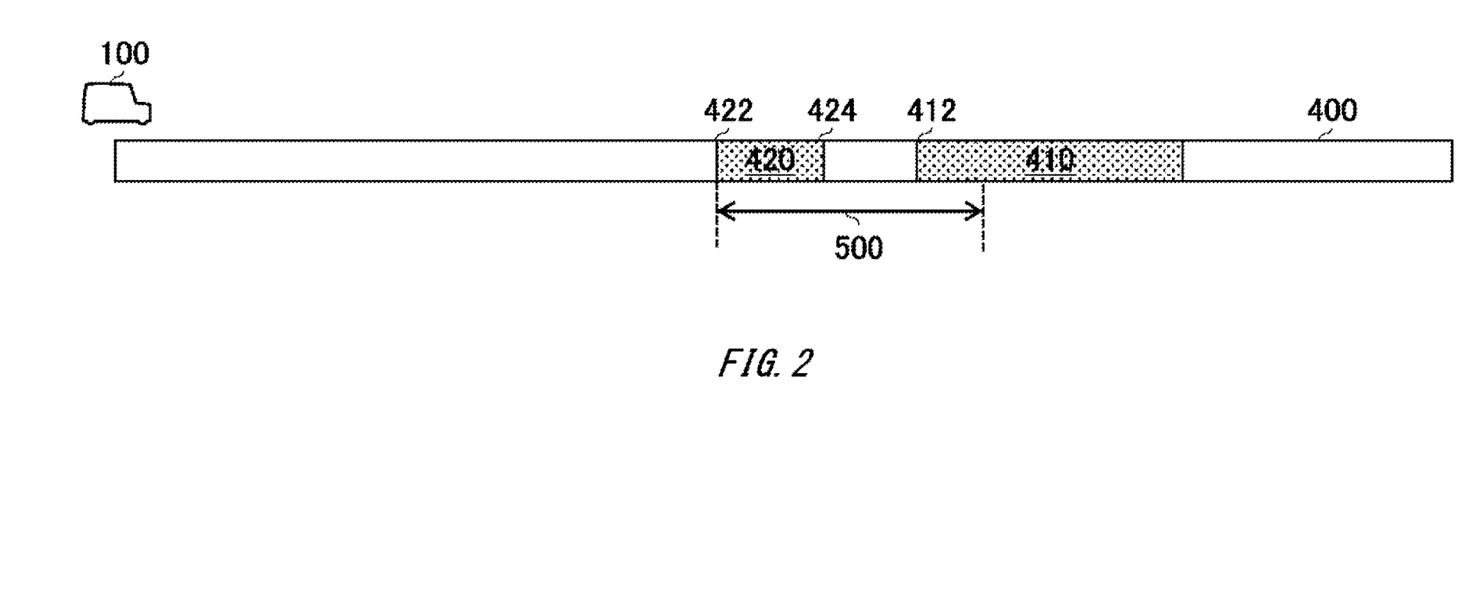
FIG. 2 is an illustration for explaining an execution timing of OBD failure detection by an in-vehicle device 200.
Figure 3:
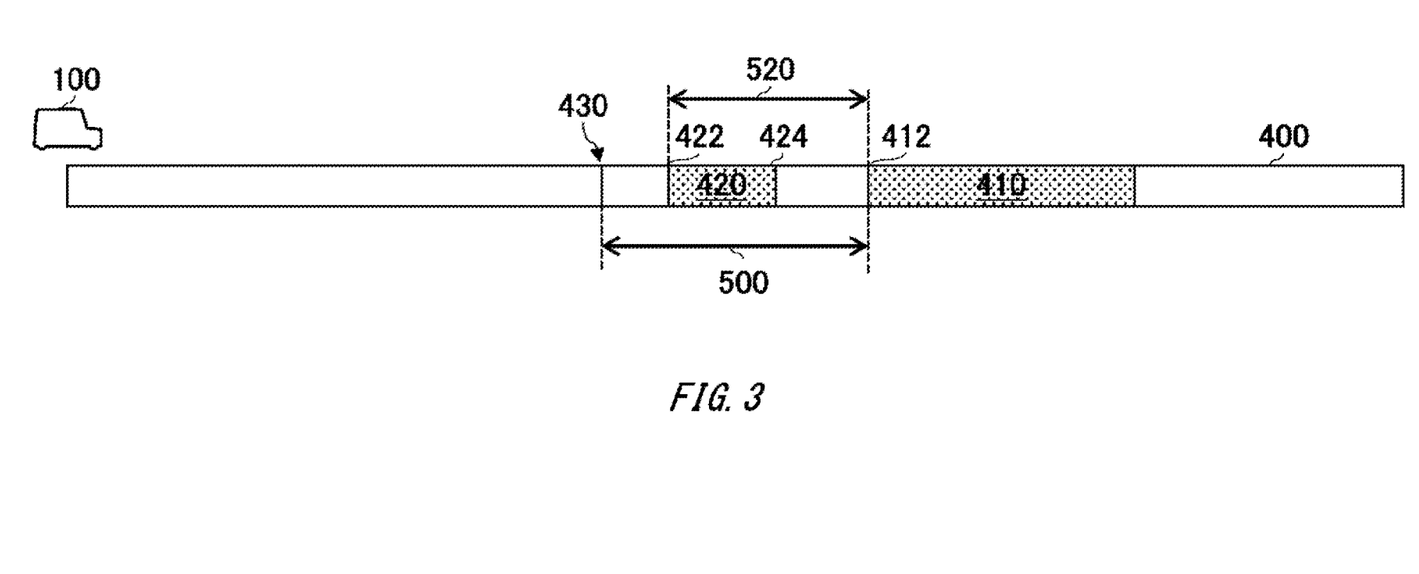
FIG. 3 is an illustration for explaining an execution timing of the OBD failure detection by the in-vehicle device 200.

FIG. 2 and FIG. 3 are illustrations for explaining an execution timing of the OBD failure detection by the in-vehicle device 200. The OBD time 500 indicates a time that is set as the time required for the OBD failure detection. In other words, the OBD time 500 indicates a time from the start of execution of the OBD failure detection to the completion of the execution.

Execution of the OBD failure detection requires the engine being operating. Conventionally, a hybrid vehicle has been configured to preferentially execute the non-engine travelling for fuel saving, and execute the OBD failure detection at the timing when the engine 112 is started in the engine requiring section 420 or the like in which a high output is required such as an upward slope, for example. However, as shown in FIG. 2, in a case where an engine travelling restricted section 410 exists after the engine requiring section 420, the hybrid vehicle needs to stop the engine 112 during execution of the OBD failure detection and therefore cannot complete the OBD failure detection.

In contrast, for example, the in-vehicle device 200 according to the present embodiment is configured to estimate a travelling time 520 during which the own vehicle travels from a starting point 422 of an engine requiring section 420 to a starting point 412 of an engine travelling restricted section 410 in a travelling route 400, and cause the own vehicle to start the engine 112 and start the engine travelling before the engine requiring section 420 when the travelling time 520 is shorter than an OBD time 500.

For example, the in-vehicle device 200 is configured to decide an engine travelling starting point 430 at which the in-vehicle device 200 causes the own vehicle to start the engine travelling based on a subtracted time obtained by subtracting the travelling time 520 from the OBD time 500. For example, the in-vehicle device 200 is configured to decide the engine travelling starting point 430 such that the travelling time from the engine travelling starting point 430 to the starting point 422 of the engine requiring section 420 becomes equal to the subtracted time. Then, the in-vehicle device 200 is configured to cause the own vehicle to start the engine travelling and start the OBD failure detection in response to the own vehicle being located at the engine travelling starting point 430.

This can prevent the own vehicle to enter the engine travelling restricted section 410 in the middle of the OBD failure detection while utilizing the engine travelling in the engine requiring section 420.

Figure 4:
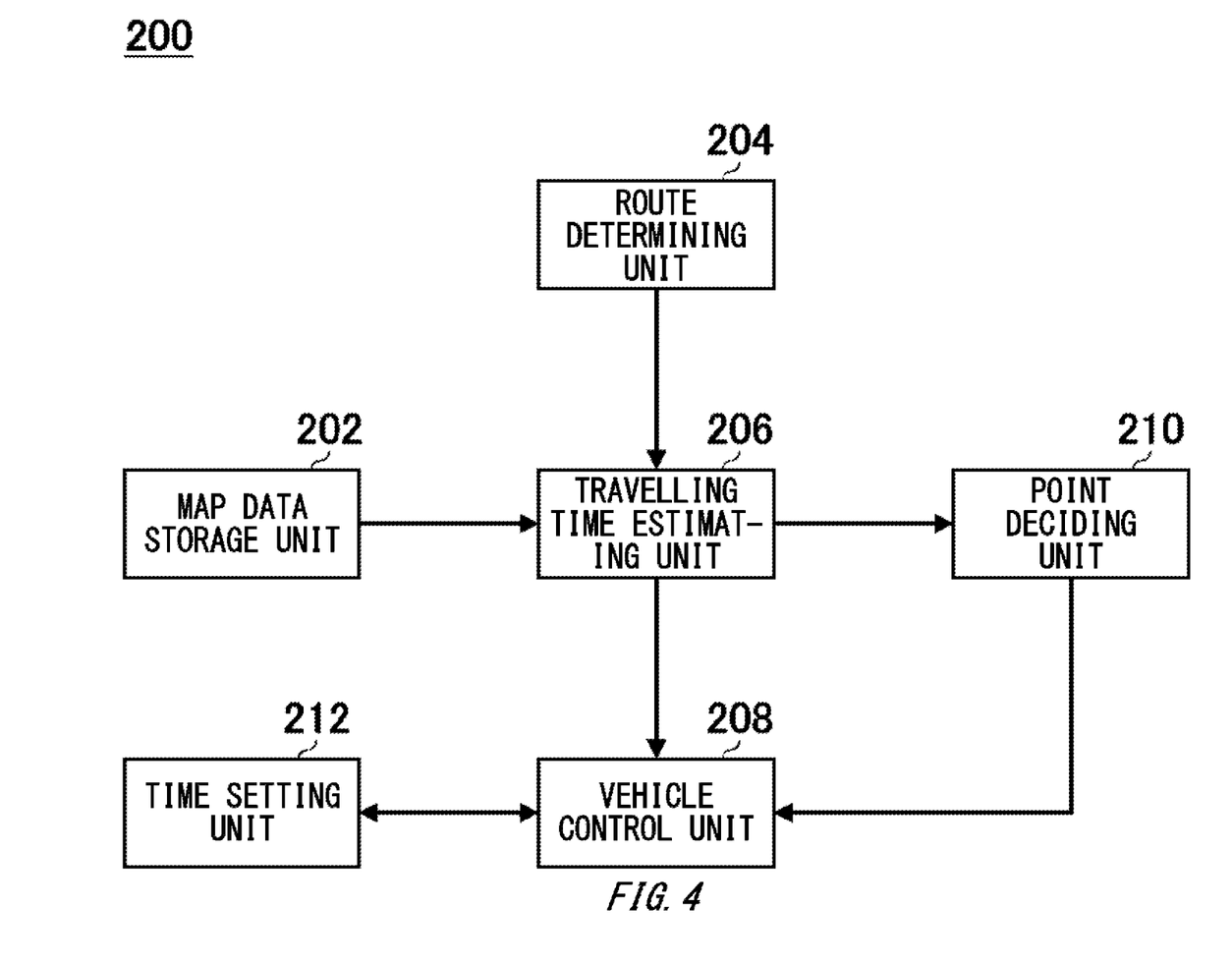
FIG. 4 schematically shows one example of a functional configuration of the in-vehicle device 200.

FIG. 4 schematically shows one example of a functional configuration of the in-vehicle device 200. The in-vehicle device 200 includes a map data storage unit 202, a route determining unit 204, a travelling time estimating unit 206, a vehicle control unit 208, a point deciding unit 210, and a time setting unit 212. Note that the in-vehicle device 200 does not necessarily include all of them.

The map data storage unit 202 is configured to store map data. The map data storage unit 202 may update the map data by information received from the management server 300.

The route determining unit 204 is configured to determine a travelling route of the own vehicle. For example, the route determining unit 204 is configured to determine a set route to a destination that is set in a navigation system of the own vehicle as the travelling route.

The travelling time estimating unit 206 is configured to judge whether the travelling route determined by the route determining unit 204 includes an engine travelling restricted section and an engine requiring section exists before the engine travelling restricted section in the travelling route.

The travelling time estimating unit 206 may judge whether an engine travelling restricted section exists on the travelling route by referring to the map data stored in the map data storage unit 202. The travelling time estimating unit 206 is configured to, in a case where the map data is associated with information indicating the engine travelling restricted section, judge whether an engine travelling restricted section exists by referring to the information. In a case where the map data is not associated with the information indicating the engine travelling restricted section, the travelling time estimating unit 206 may judge whether an engine travelling restricted section exists based on road information corresponding to the travelling route. For example, the travelling time estimating unit 206 is configured to judge an area designated in advance as an area in which noise should be suppressed such as a residential area and an educational institution within the travelling route, as the engine travelling restricted section.

The travelling time estimating unit 206 may judge whether an engine requiring section exists on the travelling route by referring to the map data stored in the map data storage unit 202. The travelling time estimating unit 206 is configured to, in a case where the map data is associated with information indicating the engine requiring section, judge whether an engine requiring section exists by referring to the information. In a case where the map data is not associated with the engine requiring section, the travelling time estimating unit 206 may judge whether an engine requiring section exists based on road information corresponding to the travelling route. For example, the travelling time estimating unit 206 is configured to judge an upward slope that has a steeper grade than a predetermined value, a junction area to a highway or the like within the travelling route, as the engine requiring section.

The travelling time estimating unit 206 is configured to, in a case where the travelling time estimating unit 206 judges that the travelling route includes an engine travelling restricted section and an engine requiring section exists before the engine travelling restricted section in the travelling route, estimate a travelling time during which the own vehicle travels from the beginning of the engine requiring section to the engine travelling restricted section.

The travelling time estimating unit 206 may estimate the travelling time based on the map data stored in the map data storage unit 202. The travelling time estimating unit 206 may estimate the travelling time based on the road information. For example, the travelling time estimating unit 206 is configured to estimate the travelling time based on a distance from the beginning of the engine requiring section to the engine travelling restricted section, a shape of the road, a speed limit of the road, a congestion degree of the road, a statistical vehicle velocity of the road, or the like. The travelling time estimating unit 206 may estimate the travelling time further based on weather information from the beginning of the engine requiring section to the engine travelling restricted section.

The vehicle control unit 208 is configured to cause the own vehicle to start the engine 112 before the engine requiring section when the travelling time estimated by the travelling time estimating unit 206 is shorter than a predetermined time. The predetermined time may be a time that is set as the time required for self-diagnostics to be executed during an engine operation of the hybrid vehicle. The self-diagnostics may be OBD failure detection.

For example, the time required for the self-diagnostics is set by a manufacturer or the like at the time of manufacturing the in-vehicle device 200. The time required for the self-diagnostics may be set at the time of mounting the in-vehicle device 200 into the hybrid vehicle 100. In addition, the time required for the self-diagnostics may be set by an owner of the hybrid vehicle 100 or the like after selling the hybrid vehicle 100 in which the in-vehicle device 200 is mounted.

The vehicle control unit 208 may cause the own vehicle to start the engine 112 and start the engine travelling before the engine requiring section when the travelling time estimated by the travelling time estimating unit 206 is shorter than the predetermined time. The vehicle control unit 208 may start the self-diagnostics of the own vehicle in response to having caused the own vehicle to start the engine travelling before the engine requiring section. This can reduce the possibility that the own vehicle enters the engine travelling restricted section 410 in the middle of the OBD failure detection while utilizing the engine travelling in the engine requiring section 420.

The point deciding unit 210 is configured to decide the engine travelling starting point at which the vehicle control unit 208 causes the own vehicle to start the engine travelling when the travelling time estimated by the travelling time estimating unit 206 is shorter than the predetermined time. The vehicle control unit 208 may cause the own vehicle to start the engine travelling in response to the own vehicle being located at the engine travelling starting point, and start the self-diagnostics of the own vehicle.

The point deciding unit 210 may decide the engine travelling starting point based on a subtracted time obtained by subtracting the travelling time estimated by the travelling time estimating unit 206 from the time required for the self-diagnostics. For example, the point deciding unit 210 is configured to decide the engine travelling starting point such that the travelling time from the engine travelling starting point to the engine requiring section becomes equal to the subtracted time. This can prevent the own vehicle to enter the engine travelling restricted section 410 in the middle of the OBD failure detection while utilizing the engine travelling in the engine requiring section 420.

The time setting unit 212 is configured to set the time required for the self-diagnostics of the own vehicle. For example, the time setting unit 212 is configured to record an execution history of the self-diagnostics in the hybrid vehicle 100. Then, for example, the time setting unit 212 is configured to set the mean value calculated for the execution time of the past self-diagnostics as the time required for the self-diagnostics of the own vehicle. This can reduce the difference between the set time and the actual execution time.

Figure 5:
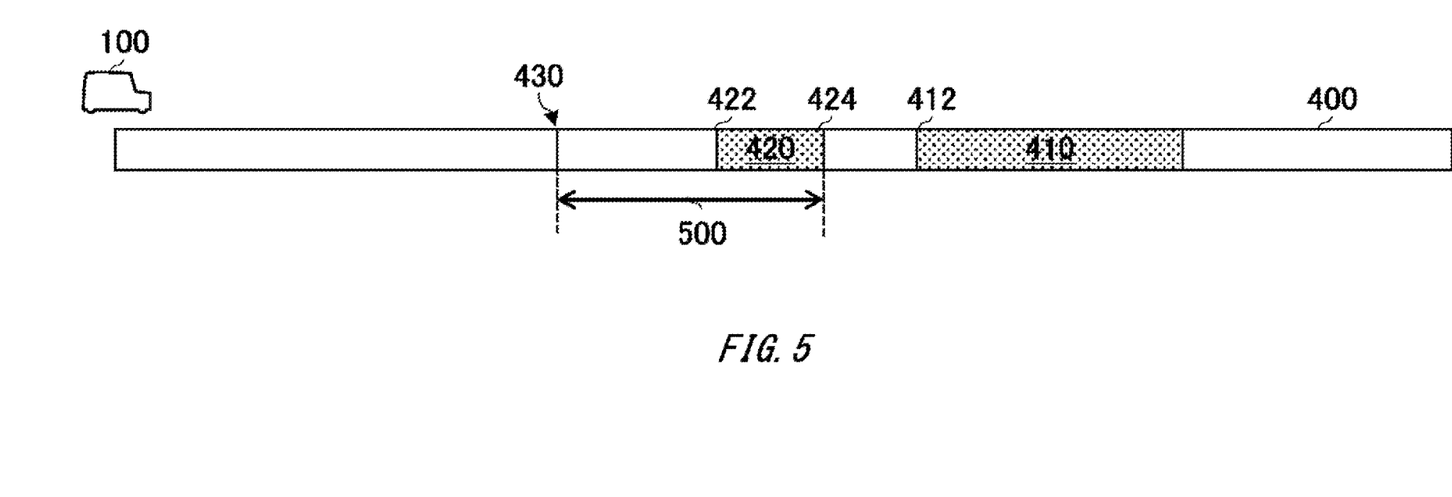
FIG. 5 schematically shows one example of an engine travelling starting point 430 decided by a point deciding unit 210.

FIG. 5 schematically shows one example of the engine travelling starting point 430 decided by the point deciding unit 210. FIG. 5 illustrates a case where the point deciding unit 210 decides an engine travelling starting point 430 such that an OBD time 500 expires at an endpoint 424 of an engine requiring section 420.

By deciding the engine travelling starting point 430 such that the OBD time 500 expires at the endpoint 424 of the engine requiring section 420, the OBD failure detection can be completed at the timing of the hybrid vehicle passing the endpoint 424 of the engine requiring section 420 while utilizing the engine travelling in the engine requiring section 420. Therefore, the hybrid vehicle can switch to the non-engine travelling quickly after the end of travelling the engine requiring section 420.

Figure 6:
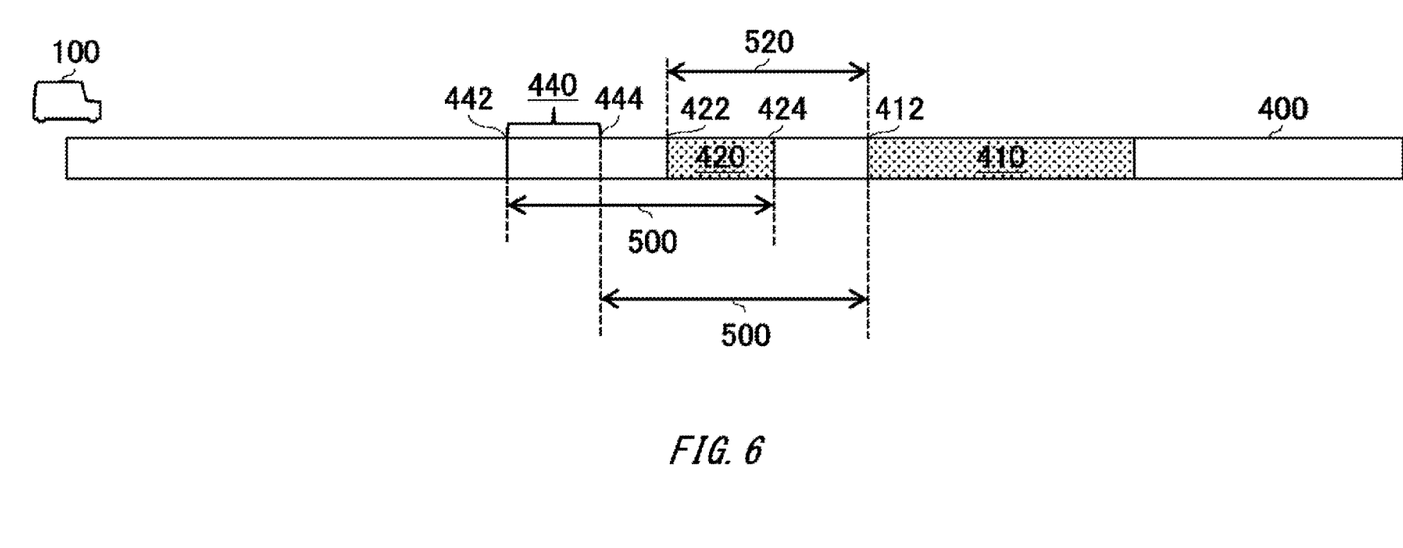
FIG. 6 schematically shows one example of a candidate area 440 of the engine travelling starting point 430 according to the point deciding unit 210.

FIG. 6 schematically shows one example of a candidate area 440 of an engine travelling starting point 430 according to the point deciding unit 210. The point deciding unit 210 may determine the candidate area 440, which starts from the point 442 decided so that the OBD time 500 expires at the endpoint 424 of the engine requiring section 420 and ends at the point 444 decided so that the travelling time from the point 444 to the starting point 422 of the engine requiring section 420 is equal to the subtracted time obtained by subtracting the travelling time 520 from the OBD time 500.

The point deciding unit 210 may decide any location within the candidate area 440 as the engine travelling starting point 430. Thus, the point deciding unit 210 can decide the engine travelling starting point 430 that can prevent the own vehicle to enter the engine travelling restricted section 410 in the middle of the OBD failure detection while utilizing the engine travelling in the engine requiring section 420.

Figure 7:
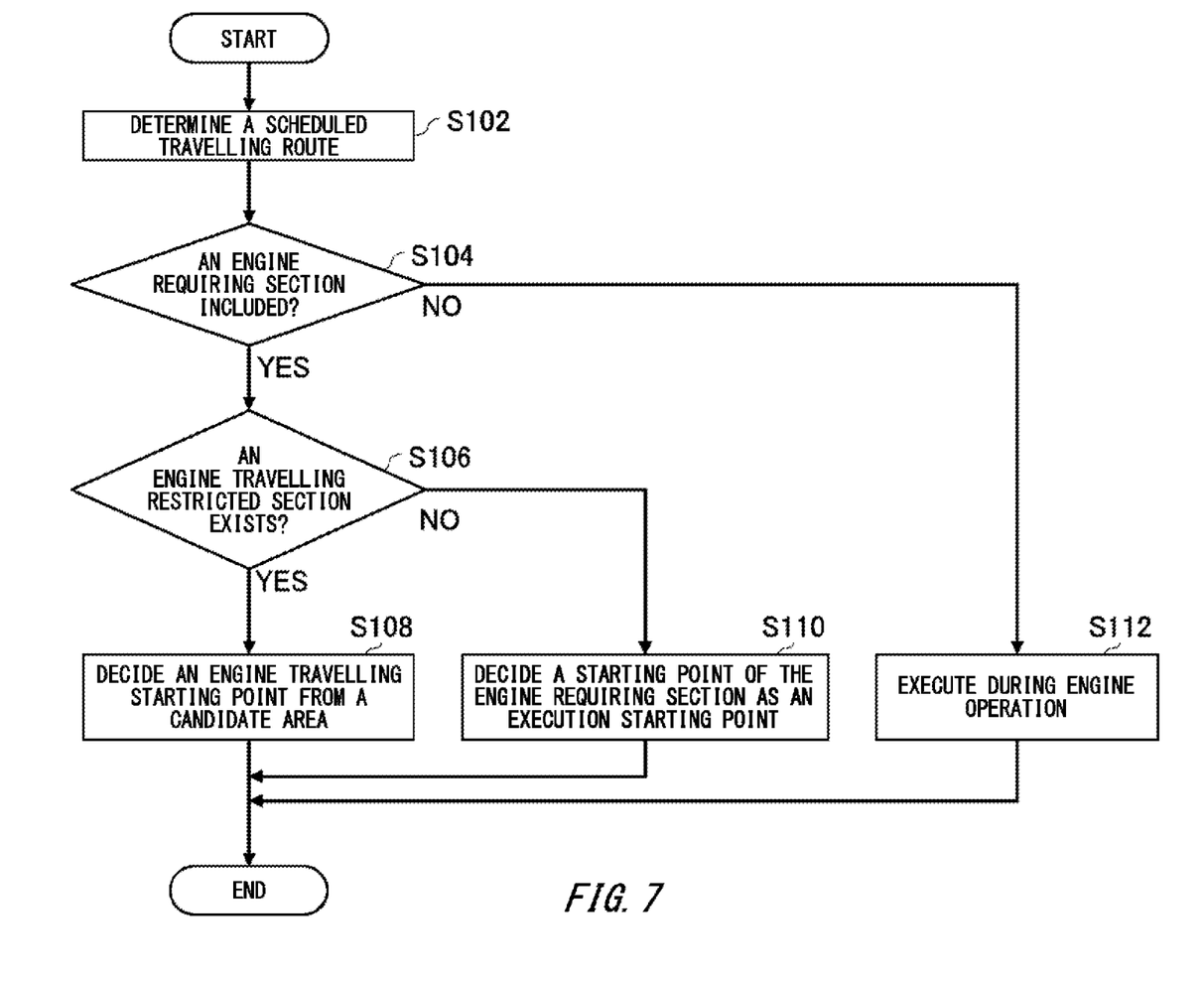
FIG. 7 schematically shows one example of a processing flow of the in-vehicle device 200.

FIG. 7 schematically shows one example of a processing flow of the in-vehicle device 200. Described here is the processing flow from a starting state in which the travelling route 400 of the own vehicle is decided, to decision of a point at which the OBD failure detection is started.

At Step (Step may be abbreviated as S) 102, the route determining unit 204 determines a travelling route 400 of the own vehicle. At S104, the travelling time estimating unit 206 judges whether the travelling route 400 determined at S102 includes an engine requiring section 420. When the travelling time estimating unit 206 judges that the travelling route 400 determined at S102 includes an engine requiring section 420, the process proceeds to S106, and, when the travelling time estimating unit 206 judges that the travelling route 400 determined at S102 includes no engine requiring section 420, the process proceeds to S112.

At S106, the travelling time estimating unit 206 judges whether an engine travelling restricted section 410 exists after the engine requiring section 420. When the travelling time estimating unit 206 judges that an engine travelling restricted section 410 exists after the engine requiring section 420, the process proceeds to S108, and, when the travelling time estimating unit 206 judges that no engine travelling restricted section 410 exists after the engine requiring section 420, the process proceeds to S110.

At S108, the point deciding unit 210 determines a candidate area 440 for an engine travelling starting point 430, and decides the engine travelling starting point 430 from the candidate area 440. The vehicle control unit 208 may decide the engine travelling starting point 430 as a starting point of OBD failure detection.

At S110, the vehicle control unit 208 decides a starting point 422 of the engine requiring section 420 as the starting point of the OBD failure detection. At S112, the vehicle control unit 208 decides to execute the OBD failure detection during engine operation.

In FIG. 1 to FIG. 7, the in-vehicle device 200 is described as one example of the control device, but it is not limited thereto. The management server 300 may function as the control device.

Figure 8:
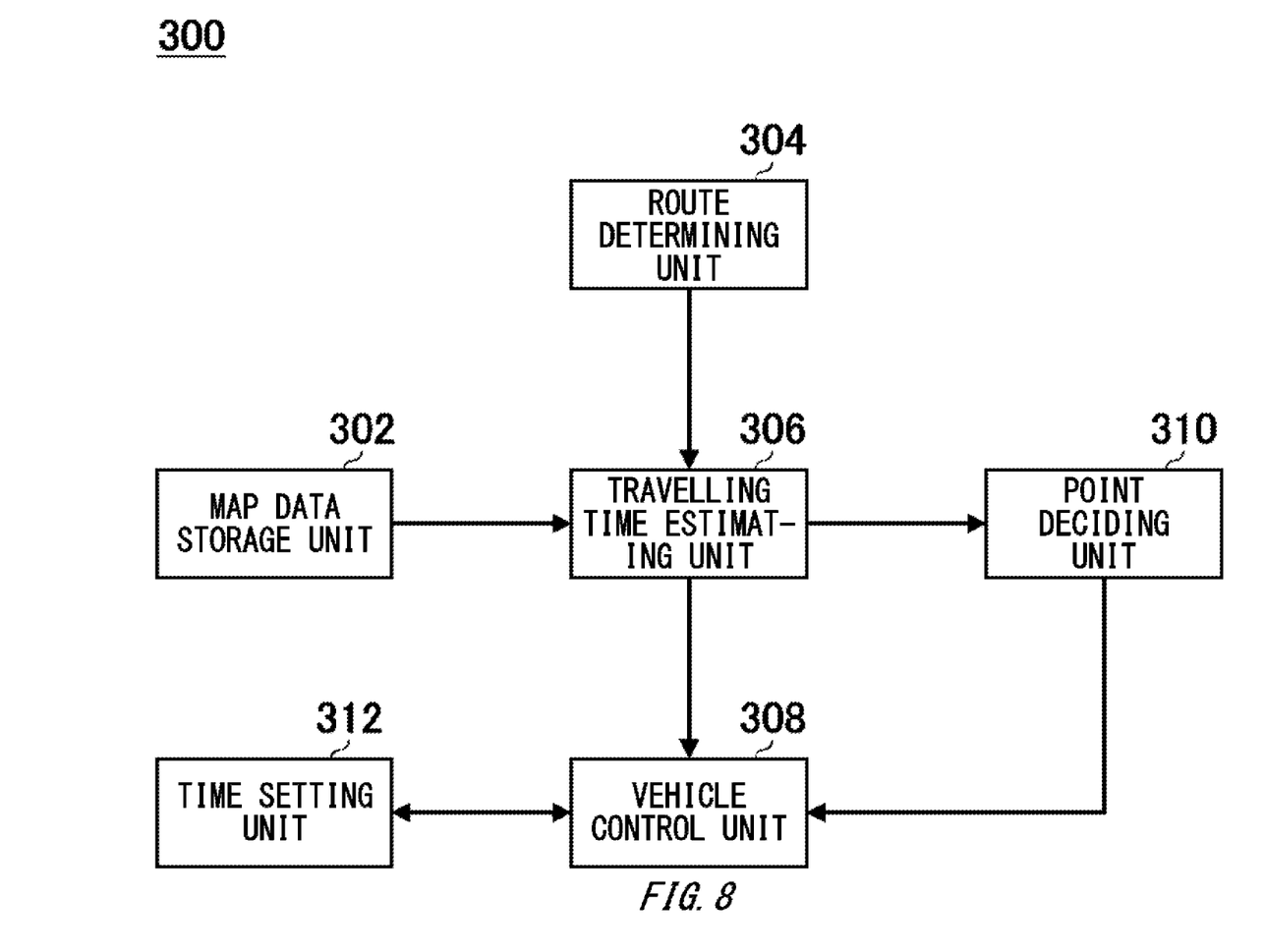
FIG. 8 schematically shows one example of a functional configuration of a management server 300.

FIG. 8 schematically shows one example of a functional configuration of the management server 300. The management server 300 includes a map data storage unit 302, a route determining unit 304, a travelling time estimating unit 306, a vehicle control unit 308, a point deciding unit 310, and a time setting unit 312. Note that the management server 300 does not necessarily include all of them.

The map data storage unit 302 is configured to store map data. The route determining unit 304 is configured to determine a travelling route of the hybrid vehicle 100 to be controlled (which may be described as the target vehicle). The route determining unit 304 may receive a notification about the travelling route from the target vehicle. In addition, the route determining unit 304 may receive a notification about a destination from the target vehicle, determine a travelling route to the destination, and notify the target vehicle about the travelling route to the destination.

The travelling time estimating unit 306 is configured to judge whether the travelling route determined by the route determining unit 304 includes an engine travelling restricted section and an engine requiring section exists before the engine travelling restricted section in the travelling route. Then, the travelling time estimating unit 306 is configured to, in a case where the travelling time estimating unit 306 judges that the travelling route includes an engine travelling restricted section and an engine requiring section exists before the engine travelling restricted section in the travelling route, estimate a travelling time during which the target vehicle travels from the beginning of the engine requiring section to the engine travelling restricted section. The travelling time estimating unit 306 may execute a similar processing to that of the travelling time estimating unit 206.

The vehicle control unit 308 is configured to control the target vehicle by sending an indication to the target vehicle. The vehicle control unit 308 is configured to cause the target vehicle to start the engine 112 before the engine requiring section when the travelling time estimated by the travelling time estimating unit 306 is shorter than a predetermined time. The vehicle control unit 308 may execute a similar processing to that of the vehicle control unit 208.

The point deciding unit 310 is configured to decide an engine travelling starting point at which the vehicle control unit 308 causes the target vehicle to start the engine travelling when the travelling time estimated by the travelling time estimating unit 306 is shorter than the predetermined time. The point deciding unit 310 may execute a similar processing to that of the point deciding unit 210. The vehicle control unit 308 may control the target vehicle to start the engine travelling in response to the target vehicle being located at the engine travelling starting point and start the self-diagnostics.

The time setting unit 312 is configured to set, for each target vehicle, a time required for the self-diagnostics of the target vehicle. For example, the time setting unit 312 is configured to receive and record an execution history of the self-diagnostics in the target vehicle from the target vehicle. Then, for example, the time setting unit 312 is configured to set the mean value calculated for the execution time of the past self-diagnostics as the time required for the self-diagnostics of the target vehicle.

Figure 9:
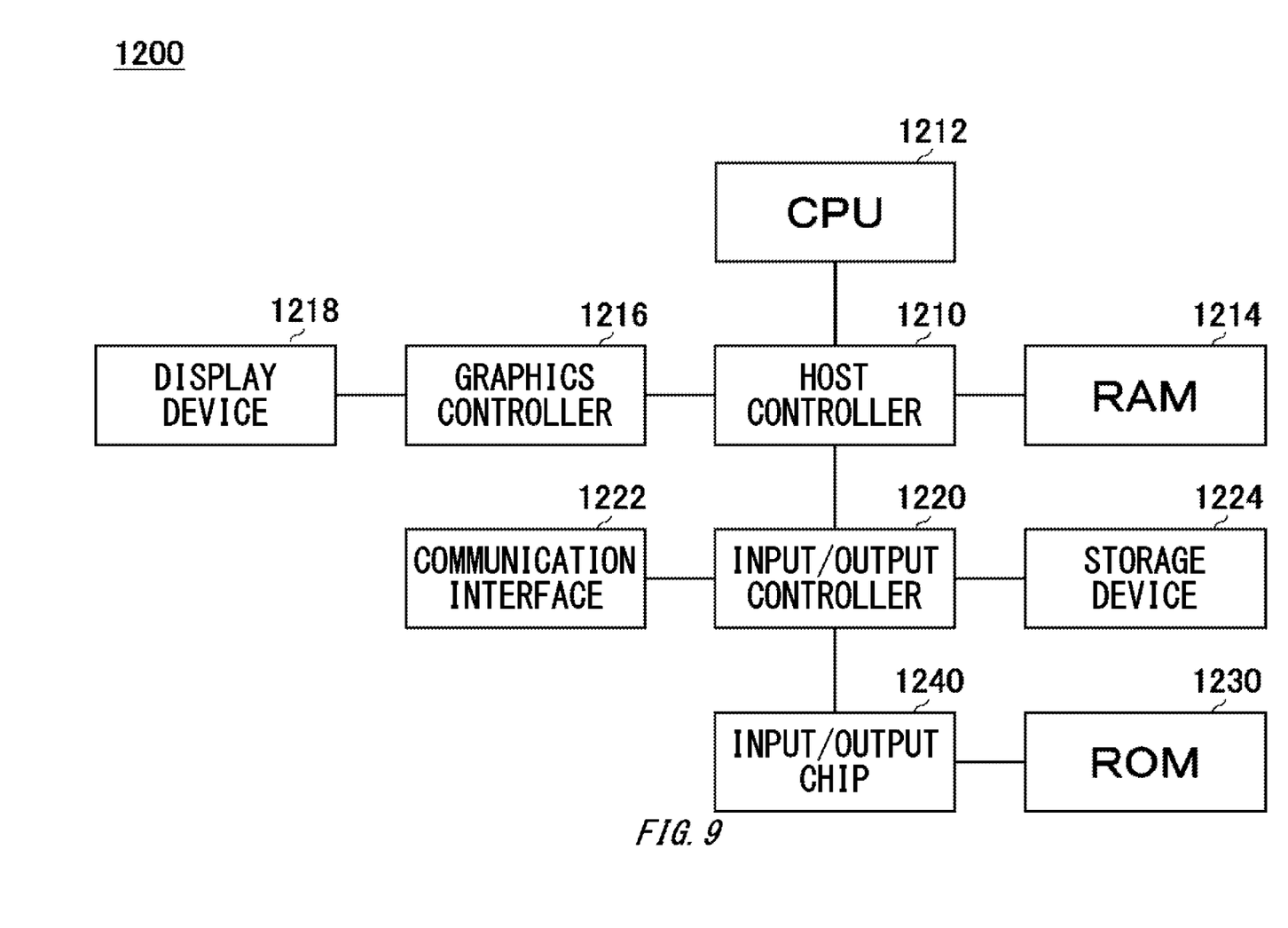
FIG. 9 schematically shows one example of a hardware configuration of a computer 1200 configured to function as the in-vehicle device 200 or the management server 300.

FIG. 9 schematically shows one example of a hardware configuration of a computer 1200 configured to function as the in-vehicle device 200 or the management server 300. A program that is installed in the computer 1200 can cause the computer 1200 to function as one or more "units" of apparatuses of the present embodiments or perform operations associated with the apparatuses of the present embodiments or the one or more units, and/or can cause the computer 1200 to perform processes of the present embodiments or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, and a graphics controller 1216, which are mutually connected by a host controller 1210. The computer 1200 also includes input/output units such as a communication interface 1222, a storage device 1224, a DVD drive and an IC card drive, which are connected to the host controller 1210 via an input/output controller 1220. The DVD drive may be a DVD-ROM drive, a DVD-RAM drive, etc. The storage device 1224 may be a hard disk drive, a solid-state drive, etc. The computer 1200 also includes legacy input/output units such as a ROM 1230 and a keyboard, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on a display device 1218.

The communication interface 1222 communicates with other electronic devices via a network. The storage device 1224 stores programs and data used by the CPU 1212 within the computer 1200. The DVD drive reads the programs or the data from the DVD-ROM or the like, and provides the storage device 1224 with the programs or the data. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port or the like to the input/output controller 1220.

A program is provided by a computer readable storage medium such as the DVD-ROM or the IC card. The program is read from the computer readable storage medium, installed into the storage device 1224, RAM 1214, or ROM 1230, which are also examples of a computer readable storage medium, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, information processing, condition judging, conditional branch, unconditional branch, search/replacement of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry whose attribute value of the first attribute matches the condition a designated condition, from among the plurality of entries, and read the attribute value of the second attribute stored in the entry, thereby obtaining the attribute value of the second attribute associated with the first attribute satisfying the predetermined condition.

The above described program or software modules may be stored in the computer readable storage medium on or near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of apparatuses responsible for performing operations. Certain steps and "units" may be implemented by dedicated circuitry, programmable circuitry supplied with computer readable instructions stored on a computer readable storage medium, and/or processors supplied with computer readable instructions stored on a computer readable storage medium. Dedicated circuitry may include digital and/or analog hardware circuits and may include integrated circuits (IC) and/or discrete circuits. For example, programmable circuitry may include reconfigurable hardware circuits including logical AND, OR, XOR, NAND, NOR, and other logical operations, flip-flops, registers, and memory elements, such as field-programmable gate arrays (FPGA), programmable logic arrays (PLA), etc.

A computer readable storage medium may include any tangible device that can store instructions for execution by a suitable device, such that the computer readable storage medium having instructions stored therein comprises an article of manufacture including instructions which can be executed to create means for performing operations specified in the flowcharts or block diagrams. Examples of the computer readable storage medium may include an electronic storage medium, a magnetic storage medium, an optical storage medium, an electromagnetic storage medium, a semiconductor storage medium, etc. More determine examples of the computer readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 20: network, 100: hybrid vehicle, 110: tank, 112: engine, 120: battery, 122: motor, 200: in-vehicle device, 202: map data storage unit, 204: route determining unit, 206: travelling time estimating unit, 208: vehicle control unit, 210: point deciding unit, 212: time setting unit, 300: management server, 302: map data storage unit, 304: route determining unit, 306: travelling time estimating unit, 308: vehicle control unit, 310: point deciding unit, 312: time setting unit, 400: travelling route, 410: engine travelling restricted section, 412: starting point, 420: engine requiring section, 422: starting point, 424: endpoint, 430: engine travelling starting point, 440: candidate area, 442: point, 444: point, 500: OBD time, 520: travelling time, 1200: computer, 1210: host controller, 1212: CPU, 1214: RAM, 1216: graphics controller, 1218: display device, 1220: input/output controller, 1222: communication interface, 1224: storage device, 1230: ROM, 1240: input/output chip

What is claimed is:

1. A control device comprising:
a route determining unit configured to determine a travelling route of a hybrid vehicle;
a travelling time estimating unit configured to, in a case where the travelling route includes an engine travelling restricted section and an engine requiring section, in which engine travelling is required, exists before the engine travelling restricted section in the travelling route, estimate a travelling time during which the hybrid vehicle travels from the beginning of the engine requiring section to the engine travelling restricted section;
a vehicle control unit configured to cause the hybrid vehicle to start an engine and start the engine travelling before the engine requiring section when the travelling time is shorter than a predetermined time; and
a point deciding unit configured to decide an engine travelling starting point in the travelling route, at which the vehicle control unit causes the hybrid vehicle to start the engine travelling when the travelling time is shorter than the predetermined time,
wherein the vehicle control unit is configured to cause the hybrid vehicle to start the engine travelling in response to the hybrid vehicle being located at the engine travelling starting point, and
wherein the point deciding unit is configured to decide the engine travelling starting point based on a subtracted time obtained by subtracting the travelling time estimated by the travelling time estimating unit from a time required for self-diagnostics of the hybrid vehicle.

2. The control device according to claim 1, wherein the predetermined time is a time that is set as the time required for self-diagnostics to be executed during an engine operation of the hybrid vehicle.

3. The control device according to claim 2, wherein the self-diagnostics is OBD failure detection.

4. The control device according to claim 3, wherein the vehicle control unit is configured to start self-diagnostics of the hybrid vehicle in response to having caused the hybrid vehicle to start the engine travelling before the engine requiring section.

5. The control device according to claim 3, comprising:
a map data storage unit configured to store map data associated with the engine travelling restricted section,
wherein the travelling time estimating unit is configured to judge whether the travelling route includes the engine travelling restricted section by referring to the map data.

6. The control device according to claim 2, wherein the vehicle control unit is configured to start self-diagnostics of the hybrid vehicle in response to having caused the hybrid vehicle to start the engine travelling before the engine requiring section.

7. The control device according to claim 2, comprising:
a map data storage unit configured to store map data associated with the engine travelling restricted section,
wherein the travelling time estimating unit is configured to judge whether the travelling route includes the engine travelling restricted section by referring to the map data.

8. The control device according to claim 2, comprising:
a map data storage unit configured to store map data including road information,
wherein the travelling time estimating unit is configured to judge whether the travelling route includes the engine travelling restricted section based on the road information by referring to the road information corresponding to the travelling route from the map data.

9. The control device according to claim 1, wherein the vehicle control unit is configured to start self-diagnostics of the hybrid vehicle in response to having caused the hybrid vehicle to start the engine travelling before the engine requiring section.

10. The control device according to claim 1, wherein the point deciding unit is configured to decide the engine travelling starting point such that a travelling time from the engine travelling starting point to the engine requiring section becomes equal to the subtracted time.

11. The control device according to claim 1, wherein the point deciding unit is configured to decide the engine travelling starting point such that a time required for self-diagnostics of the hybrid vehicle expires at an endpoint of the engine requiring section.

12. The control device according to claim 1, further comprising:
a map data storage unit configured to store map data associated with the engine travelling restricted section,
wherein the travelling time estimating unit is configured to judge whether the travelling route includes the engine travelling restricted section by referring to the map data.

13. The control device according to claim 1, comprising:
a map data storage unit configured to store map data including road information,
wherein the travelling time estimating unit is configured to judge whether the travelling route includes the engine travelling restricted section based on the road information by referring to the road information corresponding to the travelling route from the map data.

14. The control device according to claim 1, wherein the engine requiring section is a section in which an engine output is required.

15. A non-transitory computer readable storage medium having recorded thereon a program for causing a computer to function as:
- a route determining unit configured to determine a travelling route of a hybrid vehicle;
- a travelling time estimating unit configured to, in a case where the travelling route includes an engine travelling restricted section and an engine requiring section, in which engine travelling is required, exists before the engine travelling restricted section in the travelling route, estimate a travelling time during which the hybrid vehicle travels from the beginning of the engine requiring section to the engine travelling restricted section;
- a vehicle control unit configured to cause the hybrid vehicle to start an engine and start the engine travelling before the engine requiring section when the travelling time is shorter than a predetermined time; and
- a point deciding unit configured to decide an engine travelling starting point in the travelling route, at which the vehicle control unit causes the hybrid vehicle to start the engine travelling when the travelling time is shorter than the predetermined time,
wherein the vehicle control unit is configured to cause the hybrid vehicle to start the engine travelling in response to the hybrid vehicle being located at the engine travelling starting point, and
wherein the point deciding unit is configured to decide the engine travelling starting point based on a subtracted time obtained by subtracting the travelling time estimated by the travelling time estimating unit from a time required for self-diagnostics of the hybrid vehicle.

* * * * *